Figure 1:
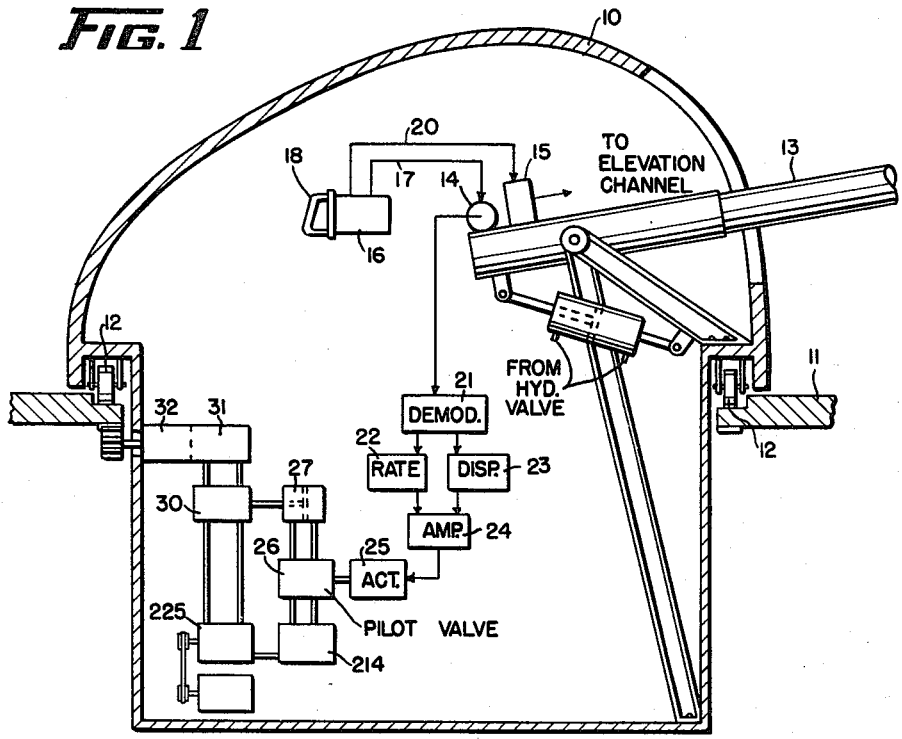

May 31, 1960

W. H. GILLE 2,938,435

CONTROL APPARATUS

Filed May 27, 1955

2 Sheets-Sheet 1

INVENTOR.
WILLIS H. GILLE

BY

ATTORNEY

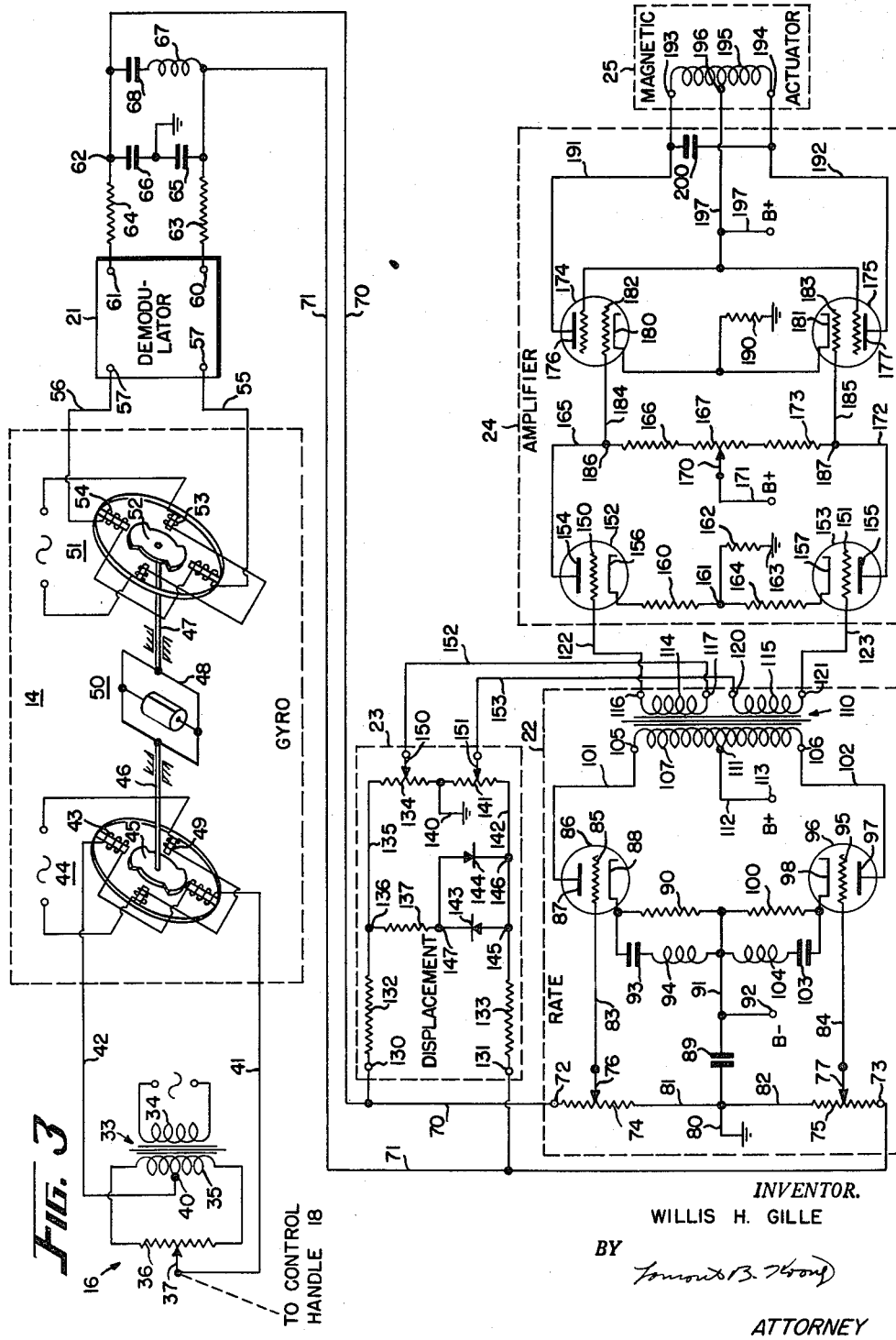

United States Patent Office 2,938,435
Patented May 31, 1960

2,938,435

CONTROL APPARATUS

Willis H. Gille, St. Paul, Minn., assignor to Minneapolis-Honeywell Regulator Company, Minneapolis, Minn., a corporation of Delaware Filed May 27, 1955, Ser. No. 511,515

11 Claims. (Cl. 89—41)

This invention relates to a system for automatically stabilizing and controlling the movement of bodies having a large amount of inertia such as a tank turret and gun.

In the past it has been the practice to stop vehicles such as tanks in order to fire the large caliber weapons. This is due in part to the rough terrain over which such vehicles must of necessity travel, making it impossible for the gunner to maintain the gun aimed at a target while in motion. It is extremely desirable to be able to accurately aim and fire the gun while the tank is in motion to prevent the tank from becoming a stationary target while firing.

Our present system of control overcomes the prior disadvantages of instability and provides a completely automatic system of stabilization of the turret and gun. The turret stabilizing system operates basically as a positional system. Stabilization is achieved by detecting changes in orientation in inertial space with displacement gyros which also initiate corrective action through the electronic and hydraulic control elements. The control handle initiates tracking motion of the turret causing it to move in the desired manner. The major stabilization loop is a displacement system, even while tracking. The integration necessary to make the gun track at a particular rate for a certain control handle displacement is achieved in the gyro, but this function is generated outside of the major loop and does not enter the stabilization picture.

Damping of the very high gain system is achieved through the use of networks in the error channel rather than from auxiliary devices such as tachometers or rate gyros. A minor loop of mechanical force feedback serves to stabilize the hydraulic valve while the major loop is closed through the spatial orientation of the gun.

An open center hydraulic valve is used to allow the turret and gun to virtually float in space in the absence of any control signal. In this way, maximum use is made of the inherent self-stabilizing properties of the high inertia turret and gun. Further, the gear trains from the hydraulic motors to the load elements have been made as small as possible to reduce the motor inertia reflected to the load. In this way the motor which must rotate in space even though the load does not, exerts a minimum destabilizing torque on the load.

An object of the invention is to provide automatic stabilization of a tank turret and gun.

Another object of the invention is to provide a system for controlling the movement of a body having a large inertia and to provide automatic stabilization of the body.

Another object of the invention is to provide in a tank turret control system a stabilization system wherein the turret and gun are free to float in space within the tank in the absence of a control signal, to make use of the inherent stability of a large mass.

Various other objects, advantages and features of novelty which characterize the invention are pointed out with particularity in the claims annexed hereto and forming a part hereof. However, for a better understanding of the invention, its advantages and objects attained by its use, reference should be had to the subjoined drawing, which forms a further part hereof, and to the accompanying descriptive matter, in which there is illustrated and described a preferred embodiment of the invention.

Figure 2:
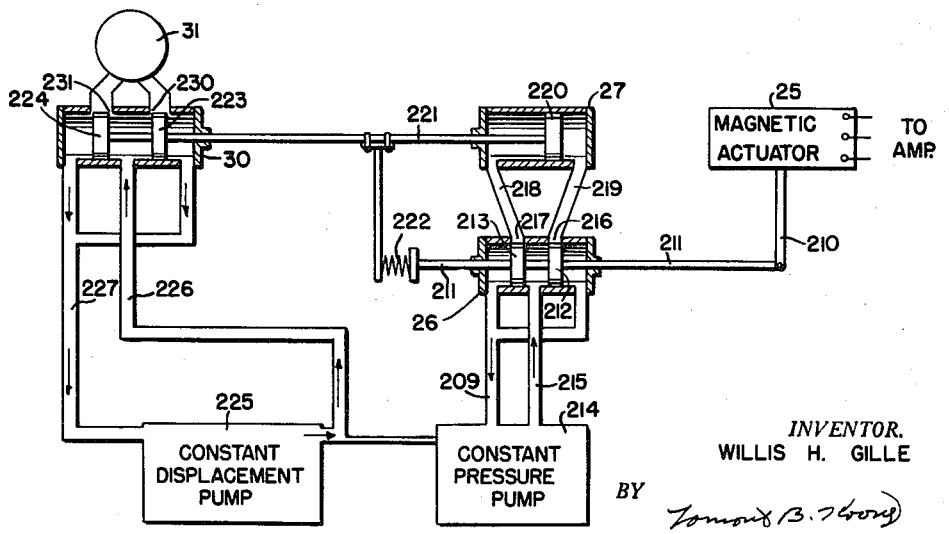

In the drawing:

Figure 1 is a diagrammatic view of the stabilization system embodying one form of the invention, Figure 2 is a detailed diagrammatic view of the hydraulic system of Figure 1, and Figure 3 is a schematic diagram of the electrical system of Figure 1.

Referring now to Figure 1 for an overall block diagram of the system, there is shown a tank turret 10 mounted in a tank hull 11. A plurality of rollers 12 support the turret so that it may be rotated within the hull. A gun 13 is mounted in the turret 10 in such a manner that it is rotated in traverse axis with rotation of the turret, while in the elevation axis the gun moves within the turret. A pair of gyros 14 and 15 are mounted on the gun breech with their spin axes along the line of sight. These gyros which preferably are rate gyros are used as displacement gyros in this system, and each gyro has a single degree of freedom. Gyro 14 is the traverse channel gyro and gyro 15 is the elevation channel gyro. A gunner's control box 16 is connected to the gyros by conductors 17 and 20. To simplify the explanation only the traverse axis stabilization and control system is shown in Figure 1; however, the control system which will be explained may also be used in the elevation axis. The gyro 14 is connected to a demodulator 21 for converting A.C. signals to D.C. The output of the demodulator is connected to a rate network 22 and a displacement network 23. The outputs of these networks are fed to an amplifier 24. The amplifier controls a magnetic actuator 25 which in turn adjusts a pilot valve 26. The pilot valve actuates a hydraulic ram 27 which controls an open center slide valve 30. The valve 30 supplies oil to a hydraulic motor 31 of the radial piston constant displacement type which then drives the turret through an anti-backlash gear arrangement 32 such as is shown in Patent No. 2,655,050, issued to Di Vette et al. and entitled "Anti-Backlash Gearing."

Referring now to Figure 3 for a more detailed description of the electrical section of the system the control box 16 is shown to comprise a power transformer 33 having a primary winding 34 energized from a source of A.C. potential. A center tapped secondary winding 35 has its end terminals connected to opposite ends of a potentiometer 36. A wiper 37 of the potentiometer is mechanically connected to a gunner's control handle 18 on control box 16 and is displaced along the potentiometer 36 by movement of the control handle in the traverse direction. Since only the traverse axis control system is being explained in detail only one potentiometer is shown in the control box 16. It is obvious, however, that for elevation control from the same control handle a second potentiometer may be mounted in the box 16, similarly connected and having a wiper mechanically connected to the control handle to be moved along the potentiometer by movement of the control handle in the elevation direction.

The wiper 37 and the center tap 40 of winding 35 are connected by conductors 41 and 42 respectively to control windings 43 of a torque generator 44 comprising a portion of gyro 14. Pattern field windings 49 of the torque generator are energized from the same A.C. source used to energize transformer 33. Gyro 14 is a single degree of freedom gyro comprising a gyroscope 50 which may be of a type such as is disclosed in an application, Serial No. 438,206, filed June 21, 1954, and entitled "Vertical Reference and Acceleration Unit," now Patent No. 2,811,043, an electrical signal generator 51, and torque generator 44. Torque generator rotor 45 and signal generator rotor 52 are securely attached to gimbal 48 of gyroscope 50 by shafts 46 and 47 so that the three elements rotate together. The gyroscope 50 has mechanical stops, not shown, which limit the rotation of the gimbal and thus the rotors 45 and 52 to a predetermined number of degrees. The signal generator 51 has one pair of its windings 53 energized from a source of A.C. which may be, for example, 3000 c.p.s. Output windings 54 of signal generator 51, which are energized when the rotor is displaced from its null position, are connected by conductors 55 and 56 to input terminals 57 of a demodulator 21 which converts the 3000 cycle signal generator output to a high level D.C. potential. If necessary, the 3000 cycle signal may be amplified before being demodulated. The output terminals 60 and 61 of the demodulator are connected through a noise filter 62 which comprises resistors 63 and 64, capacitors 65 and 66, and a tuned circuit consisting of inductance 67 and capacitor 68, and through conductors 70 and 71 to the input circuits of rate network 22 and displacement network 23 which are connected in parallel. Conductors 70 and 71 are connected to terminals 72 and 73 of two ganged "rate gain" potentiometers 74 and 75 respectively in the rate network 22. The opposite terminals of the potentiometers are connected to a ground terminal 80 through conductors 81 and 82. Wiper contacts 76 and 77 of potentiometers 74 and 75, respectively, are ganged so that as wiper 76 is moved towards terminal 72 wiper 77 is moved toward terminal 73. Wipers 76 and 77 are connected by conductors 83 and 84 to grids 85 and 95 of a pair of triodes 86 and 96 respectively. Triodes 86 and 96 also have anodes 87 and 97, and cathodes 88 and 98 respectively. Cathode 88 of triode 86 is connected through a resistor 90, conductor 91 and terminal 92 to a source of negative D.C. potential. A series connected capacitor 93 and inductance 94 are connected in parallel with resistor 90. Cathode 98 of triode 96 is connected through a resistor 100, conductor 91 and terminal 92 to the source of negative D.C. potential, a capacitor 89 is connected between conductor 91 and ground terminal 80. A series connected capacitor 103 and inductance 104 are connected in parallel with resistor 100. The anodes 87 and 97 are connected by conductors 101 and 102 to terminals 105 and 106 of a center tapped winding 107 of a transformer 110. The center tap connection 111 is connected by conductor 112 and a terminal 113 to a source of positive D.C. potential. Transformer 110 also has secondary windings 114 and 115, winding 114 having terminals 116 and 117, and winding 115 having terminals 120 and 121.

Conductors 70 and 71 also connect to input terminals 130 and 131 of displacement network 23. Displacement network 23 includes a pair of resistors 132 and 133 which have one terminal connected to input terminals 130 and 131 respectively. Resistor 132 has its opposite terminal connected to the upper terminal of a potentiometer 134 by a conductor 135. The lower terminal of potentiometer 134 is connected to ground terminal 140. Resistor 133 which had one terminal connected to input terminal 131 has its opposite terminal connected to the lower terminal of a potentiometer 141 by a conductor 142. The upper terminal of potentiometer 141 is connected to ground terminal 140. Connected between conductors 135 and 142 is a circuit designed to provide an output potential from the displacement network which is approximately equal to the square root of the input signal. This circuit consists of a pair of diodes 143 and 144 connected in parallel but connected to conduct current in opposite directions. In series with the diodes is a shaping resistor 137. Resistor 137 is connected to conductor 135 at a junction 136 and is connected to the diodes 143 and 144 at a junction 147. Diodes 143 and 144 are connected to conductor 142 at junctions 145 and 146 respectviely.

Potentiometers 134 and 141 have a pair of wipers 150 and 151 respectively which are connected through conductors 152 and 153 to terminals 117 and 120 of windings 114 and 115 respectively, of the transformer 110. In this manner the output potentials of the rate network and the displacement network are summed together. Terminals 116 and 121 are connected by conductors 122 and 123 to grid electrodes 150 and 151 of a pair of triodes 152 and 153 which are a part of amplifier 24. Triodes 152 and 153 also have anodes 154 and 155, and cathodes 156 and 157, respectively. Cathode 156 is connected through resistor 160, junction 161, and resistor 162 to ground terminal 163. Cathode 157 is connected through resistor 164, junction 161, and resistor 162 to ground terminal 163. Anode 154 is connected to a positive D.C. potential through a conductor 165, a resistor 166, the upper portion of a potentiometer 167, potentiometer slider 170 and a conductor 171. Anode 155 is connected to the positive potential through a conductor 172, a resistor 173, the lower portion of potentiometer 167, potentiometer slider 170 and conductor 171. Triodes 152 and 153 are connected in push-pull arrangement and the outputs from the stages are directly coupled to a pair of power output tubes 174 and 175. Tubes 174 and 175 comprise a pair of anodes 176 and 177, cathodes 180 and 181, and control electrodes 182 and 183, respectively. Control electrode 182 is directly coupled to the anode 154 of the previous stage by a conductor 184 which is connected to a junction 186 on the conductor 165. Control electrode 183 is likewise directly coupled to the anode 155 of the previous stage by a conductor 185 which is connected to a junction 187 on the conductor 172. The cathodes 180 and 181 are connected to ground potential through a common cathode resistor 190. The anodes 176 and 177 are connected through conductors 191 and 192 to terminals 193 and 194 of a coil 195 of the magnetic actuator 25. Coil 195 has a center tap terminal 196 which is connected to a positive D.C. potential by means of a conductor 197. A capacitor 200 is connected from plate to plate of the power amplifier in shunt with the coil 195 of the actuator to control the shape of the frequency response of the power amplifier, acutator, pilot valve and motor combination. The capacitor which introduces a lag in the signal causes roll off of system response to avoid gun whip problems and noise problems.

Referring now to Figure 2, the magnetic actuator 25, which is an electromagnetic device that converts the power amplifier current into valve movement, is shown having an armature 210, the mechanical movement of which is controlled by the output current from the amplifier 24 flowing through the coil windings 195 shown in Figure 3. The armature 210 of the arcuator is linked mechanically to a valve stem 211 of pilot valve 26. Valve stem 211 is directly attached to valve members 212 and 213. A constant pressure pump 214 supplies hydraulic fluid into the valve through intake 215. A pair of ports 216 and 217 on valve 26, which are closed by members 212 and 213 at balanced conditions, are connected to the hydraulic motor 27 so that a displacement of the valve members allows oil to flow into the motor to produce piston movement. Ram 27 has a piston 220 which moves a piston rod 221. A spring mechanism 222 connected from piston rod 221 to pilot valve stem 211 provides a mechanical feedback loop for stabilizing the pilot valve. Open center slide valve 30 has a pair of members 223 and 224 which are rigidly connected to piston rod 221 so that the slide valve member displacement is the same as that of the piston 220. A constant displacement pump 225 driven by a suitable motor supplies a constant volume of oil to valve 30 through an intake line 226 and a return line 227 regardless of the displacement of the valve. Members 223 and 224 control the fluid flow into ports 230 and 231 which are connected by suitable lines to hydraulic motor 31 which is of the radial piston, constant displacement type. The motor 31 is connected by suitable gearing apparatus 32 to drive the turret within the tank.

Operation

The operation of the stabilized turret system is substantially as follows. Referring to Figure 3, when the control handle 18 is displaced by the operator, to call for tracking of the turret, wiper 37 of potentiometer 36 which is mechanically coupled to handle 18 is displaced along the potentiometer winding from its null signal position at the center of the potentiometer winding. The output signal increases in magnitude with displacement of the wiper from the center position and reverses in phase as the direction of displacement from center reverses. The output signal is taken between the wiper and center tap 40 of transformer winding 35 and fed to the control windings 43 of torque generator 44. Energization of the control windings causes displacement of the torque rotor 45 which is rigidly coupled to gyroscope 50 and signal generator rotor 52. The displacement of the signal generator rotor results in an A.C. potential being developed on the output windings 54 which is fed to the electrical demodulator 21 for converting the A.C. potential to a reversible polarity D.C. signal. The polarity and magnitude of the D.C. signal is determined respectively by the phase and magnitude of the A.C. signal which is proportional to the direction and amount of displacement of signal generator rotor 52. The reversible polarity D.C. signal output of the demodulator flows through a suitable filter network 62 and through conductors 70 and 71 to the input of displacement network 23 and rate network 22 which are in parallel.

Damping of the high gain system is achieved through the use of networks in the error channel and a "D.C. transformer" type rate network is used. Networks of this type give rate or derivative action substantially in the following manner and provide what is frequently called a leading signal. The primary current in the rate transformer 110 is essentially in phase with the potential applied to the primary winding. The primary current is made to follow the signal potential applied to grids 85 and 95 very closely because the degenerative action of the cathode resistors 90 and 100 makes the tube impedance in series with the transformer winding very high. Thus the flux ($\phi$) is in phase with the grid voltage and the secondary voltage of transformer 110 is the derivative of the input signal because $$e_{out} = K \frac{d\phi}{dt}$$

The addition of LC filters 93 and 94, and 103 and 104, in the cathode circuit tends to bypass the cathode resistors and hence adds another rate term of approximately 45° lead to the over-all effect. This network then goes beyond giving simple error rate damping and more nearly approaches error acceleration damping at some frequencies. The amount of damping is determined by the setting of ganged "rate gain" potentiometers 74 and 75. Thus a change in the signal from the demodulator is handled by the rate network and appears on transformer windings 114 and 115.

The rate channel has no provision for passing the steady state error signal, and a parallel path around the rate network is provided for the displacement function. The D.C. signal from the demodulator is fed to the input terminals 130 and 131 of the displacement network, through the network to output terminals 150 and 151. From there the displacement signal is carried to transformer windings 114 and 115 by conductors 152 and 153 where the rate signal and the displacement signal are combined by series summing and sent to the power amplifier. The displacement network has been tailored to perform a nonlinear function that makes the response to all transients substantially the same even though the initial disturbances are of different magnitudes. It has been found that by comparing the rate or leading signal to the "nth" root, which may be for instance the square root, of the displacement signal such a system can be made to react more uniformly to various transient inputs. The square root approximating function is generated in the displacement network 23 by two diodes 143 and 144 placed back to back and loaded with a suitable shaping resistor 137 in series. The displacement gain is controlled by adjustment of the respective wipers on gain potentiometers 134 and 141.

The series summed output of the rate and displacement networks is fed to the input of amplifier 24 which comprises push-pull voltage amplifier stages 152 and 153 and power amplifier stages 174 and 175. During periods when no error signal is applied to the system, power tubes 174 and 175 conduct equally. The conduction of these tubes may be balanced by adjustment of wiper 170 on potentiometer 167 to balance the grid potentials at grids 184 and 185. The balanced output currents of tubes 174 and 175 flow into opposite ends of center tapped magnetic actuator winding 195 and the currents have equal and opposite effect in the magnetic actuator resulting in no displacement of the actuator armature 210. When an error signal is applied to the system and fed to the amplifier 24 the output currents of power tubes 174 and 175 become unbalanced, since it is a push-pull stage, and the unequal currents in the magnetic actuator winding 195 cause a displacement of the actuator armature 210 in one direction or the reverse depending on the phase of the unbalance signal. The capacitor 200 connected across the plates of the power amplifier provides a frequency attenuating means or diminution of system response in the leads to the magnetic actuator to avoid gun whip or vibration and noise problems arising if the system should be responsive to the higher frequencies. The capacitor 200 introduces a lag in the signal at this point which may approach 90° however the rate network previously described inserted approximately 135° lead into the signal so the difference between the lead and lag results in an over-all system lead of approximately 45° which is sufficient to give stable control.

In Figure 2 it can be seen that the armature 210 of magnetic actuator 25 is linked mechanically to valve stem 211 of the pilot valve 26 so that movement of the armature 210 causes a movement of the stem. Pilot valve 26 which is a closed center valve is supplied with oil at a constant pressure through inlet 215 from constant pressure pump 214. Under "no signal" conditions the pilot valve is balanced with members 212 and 213 keeping ports 216 and 217 closed, thus permitting no oil to flow through the pilot valve. Now let us assume that a signal potential in the system has caused armature 210 to move towards the left. Valve stem 211 and plungers 212 and 213 also move towards the left opening port 217 to the constant pressure source of oil. Oil flows through port 217, line 218 and into the left end of the hydraulic motor 27 forcing piston 220 to move towards the right. The oil in the right end of the motor is forced out as the piston moves and flows down through line 219, port 216, the right end of pilot valve 26, and line 209 to the pump sump. As the piston moves it carries with it rod 221. A spring mechanism 222 is connected between pilot valve stem 211 and rod 221, so that as rod 221 moves to the right the spring is compressed until the spring pressure equals the displacement torque of the magnetic actuator 25 at which point the pilot valve is rebalanced by the mechanical feedback of the spring and the piston ceases to move. Piston 220 is rigidly connected to the plungers 223 and 224 of open center slide valve 30 so that the valve member displacement is the same as the piston displacement. The slide valve and hydraulic motor 31 make up the power end of the system and receive their oil from the constant displacement pump 225. The slide valves are conventional four way designs having sufficient clearance to operate as open center valves in a constant displacement system. The valve is tailored for proper operation by chamfering the lands of the valve to obtain the desired characteristics. Under balanced conditions when the members 223 and 224 of the open center valve are centered, a constant volume of oil flows up through line 226, from constant displacement pump 225, into the valve 30. As previously stated the lands or valve members of the valve have bene chamfered so that oil can flow by the inner edges of plungers 223 and 224 into the ports 230 and 231 and back past the outer edges of the two plungers, through the ends of the valve and exhaust through low pressure line 227 to the sump of the pump 225. The valves are so chamfered that the openings past the inner edges of the valve members are much larger than the openings past the outer edges of the members. In this way, under balanced conditions, there is a relatively small pressure drop between the supply line 226 and the ports 230 and 231 while the majority of the pressure drop is devleoped when the oil is forced from the ports back past the outer edges of the valve members. Underbalanced conditions the small amount of pressure drop between the supply line and the ports is equal to both ports so there is no pressure differential across motor 31 and no rotation. Now let us assume the condition of system unbalance so that piston 220 and thus valve members 223 and 224 are displaced to the right a small distance. With a small displacement of the plungers, the oil still flows as described previously except the size of the opening past the inner edge of member 224 into port 231 is decreased and the opening into port 230 is increased. Simultaneously the opening past the outer edge of member 224 from port 231 is increased while the corresponding opening past the outer edge of member 223 decreases. A differential pressure now exists across motor 31 and the oil flows through the motor causing it to rotate and drive the turret through the gear mechanism 32. To appreciate the manner in which the motors operate it is necessary to consider the combination of open center valve and motor. It is well known that hydraulic motors of the constant displacement piston type, when supplied with a constant volume of oil, cannot, in a given operating condition, produce torque over a range of speeds. The motor attempts to develop a speed determined only by the flow of oil delivered to it, and at this speed it can produce any torque from zero to maximum. When considered in combination with the open center slide valve as the oil source, the operating characteristics of the motor tend to be changed. With this combination the motor attempts to develop a torque demanded by the load and the speed may assume any value. This system represents a drive system which is very suitable for inertial platform stabilization. The aim in such a system is to provide a torque that can be applied to the stabilized member as needed. Furthermore, when no force is called for, the stabilized element should be able to "free wheel" in order to take advantage of the inherent stability of its own mass. In other words, the open center slide valve and constant displacement motor is used to allow the turret and gun to virtually float in space in the absence of any control signal. This is possible because with the slide valve 30 centered the motor can rotate if a torque is applied from its output shaft and now acting as a pump can pump oil through the low resistance of the open center valve. The gear train 32 from the hydraulic motor to load element is made as small as possible to reduce the motor inertia reflected to the load. In this way the motor, which must rotate in space even though the turret does not, exerts a minimum destablizing torque on the turret.

The explanation of operation thus far has shown the sequence of events from the displacement of control handle 18 by the operator to the rotation of the turret in the desired direction in response thereto. As long as control handle 18 is displaced the turret will continue to rotate at a speed and in a direction determined by the magnitude and direction of displacement of the control handle.

Stabilization of the turret and gun once the gun is aimed in the proper direction is aided by the operation of the gyroscopes. Again, only the traverse gyro will be discussed, however, the elevation channel operates in substantially the same manner. The gyroscope 50 which preferably has a single degree of freedom is mounted on the gun breech with its spin axis along the line of sight of the gun. If there is a lateral movement of the turret away from the desired position, precession of the gyro results causing signal generator rotor 54 to be displaced. As previously described, an output from signal generator 51 through the control system results in energization of motor 31 to drive the turret back to the desired position at which time the gyro has precessed back to its balanced condition so that no error signal exists.

Although only the azimuthal axis stabilization and control system has been discussed it will be understood that this was for the purpose of simplification and that a similar system is used for stabilizing and controlling the elevation of the gun. The two systems operate together to maintain the gun stabilized in space in both azimuth and elevation. Obviously, in speaking of a gun, the aiming means for the gun or similar weapon is equally contemplated, for sighting is done by the aiming means rather than the gun itself, the aiming means generally being directly connected to the gun.

Many changes and modifications of this invention will undoubtedly occur to those who are skilled in the art and I therefore wish it to be understood that I intend to be limited by the scope of the appended claims and not by the specific embodiment of my invention which is disclosed herein for the purpose of illustration only.

I claim as my invention:

1. In a control system for stabilizing a controlled object; a controlled object; displacement responsive means mounted on said controlled object which means produces an electrical error potential output of a sense and magnitude determined by the direction and amount of displacement of said controlled object from a desired position; electrical circuit means connected to the output of said responsive means for modifying said error potential comprising rate responsive means producing a first voltage proportional in magnitude to the rate of change of said error potential, nonlinear displacement responsive means connected to the output of said displacement responsive means for producing a second voltage substantially equal to the $n$th root of the applied error potential, signal combining and amplifier means responsive to said first and second voltages producing an output potential proportional to said voltages; frequency selective attenuating means connected to the output of said amplifier means to provide a roll off of output at increasing error signal frequencies; and variable speed driving means connected to said controlled object and actuated in accordance with the output potential from said amplifier means to drive said controlled object back to said desired position.

2. In a control system for stabilizing a controlled object; a controlled object; displacement responsive means mounted on said controlled object which means produces an electrical error potential output of a sense and magnitude determined by the direction and amount of displacement of said controlled object from a desired position; electrical circuit means connected to the output of said responsive means for modifying said error potential comprising rate responsive means producing a first voltage proportional in magnitude to the rate of change of said error potential, nonlinear displacement responsive means connected to said displacement responsive means producing a second voltage proportional to the applied error potential, signal combining and amplifier means responsive to said first and second voltages producing an output potential proportional to said voltages; and variable speed driving means connected to said controlled object and actuated in accordance with the output potential from said amplifier means to drive said controlled object back to said desired position.

3. In a control system for stabilizing a gun comprising: a gun rotatably mounted in a craft; displacement gyro means mounted on said gun responsive to displacement of said gun from a stabilized position, which gyro means produces error potentials of variable magnitude and reversible sense depending on the amount and direction of displacement of said gun; electrical circuitry means, having an input circuit connected to said gyro means, comprising parallel circuit means including rate responsive means producing a first voltage proportional in magnitude to the rate of change of said error potential of said gyro means, non-linear displacement responsive means producing a second voltage substantially equal to a root greater than the first power of the applied error potential from said gyro means, and further circuit means responsive to said first and second voltages producing an output potential proportional to said voltages; frequency selective attenuating means connected to the output of said circuitry means to provide increasing attenuation of output with increase in frequency of the error signal; and variable speed driving means for said gun actuated in accordance with the output potential from said circuitry means to drive said gun back to said desired position.

4. In a control system for stabilizing a gun in a craft comprising: a gun to be stabilized in azimuth and elevation, said gun being movably mounted in said craft; displacement gyro means mounted on said gun responsive to displacement of said gun from a stabilized position, which gyro means produces output potentials of variable magnitude and reversible sense depending on the amount and direction of displacement of said gun; electrical circuitry means, having an input circuit connected to said gyro means, comprising parallel circuit means including rate responsive means producing a first voltage proportional in magnitude to the rate of change of said output potential of said gyro means, nonlinear displacement responsive means producing a second voltage substantially equal to the square root of the applied potential from said gyro means, and further circuit means responsive to said first and second voltages producing an output potential proportional to said voltages; and variable speed driving means for said gun actuated in accordance with the output potential from said circuitry means to drive said gun back to said desired position.

5. In a system for automatically stabilizing and controlling a weapon in a craft comprising: a gun rotatably mounted in said craft; driving means for said gun including motor means energizable to control rotation of said gun, said driving means when deenergized offering substantially no opposition to rotation of said gun thus allowing said gun to float freely on its mountings to utilize the self-stability of a heavy object; displacement gyro means mounted on said gun responsive to displacement of said gun from a stabilized position, which gyro means produces alternating current error potentials of a magnitude and phase dependent respectively on the amount and direction of displacement of said gun; electrical circuitry means having an input circuit connected to said gyro means, said circuitry means comprising demodulator means for converting the alternating error potential of said gyro means to a corresponding direct current potential of reversible polarity dependent on the phase of said gyro error potential, rate responsive means connected to said demodulator means for producing a first signal proportional in magnitude to the rate of change of said direct current potential, nonlinear means connected to said demodulator means having an output potential substantially equal to the demodulator output raised to the 1/n power; and amplifier means, responsive to the combined output potentials of said rate responsive means and said nonlinear means, connected to energize said driving means.

6. In a system for automatically stabilizing and controlling a weapon in a craft comprising: a weapon movably mounted in said craft; driving means for said weapon including motor means energizable to control rotation of said weapon, said driving means when deenergized providing free movement of said gun to utilize the self-stability of a heavy object; displacement gyro means mounted on said gun responsive to displacement of said weapon from a stabilized position, which gyro means produces alternating current output potentials of a magnitude and phase dependent respectively on the amount and direction of displacement of said weapon; electrical circuitry means having an input circuit connected to said gyro means comprising, demodulator means for converting the alternating output potential of said gyro means to a corresponding direct current potential of reversible polarity dependent on the phase of said gyro output, rate responsive means connected to said demodulator means for producing a first signal proportional in magnitude to the rate of change of said direct current potential, nonlinear means connected to said demodulator means having an output potential substantially equal to the demodulator output raised to the 1/n power; amplifier means responsive to the combined output potentials of said rate responsive means and said nonlinear means connected to energize said driving means; and high frequency attenuating means connected between said amplifier means and said driving means providing a roll off of signal response except at low frequencies.

7. In a system for automatically stabilizing and controlling a heavy object, a combination comprising: a controlled object rotatably mounted in a conveyance; displacement sensing means mounted on said controlled object sensing movement of said object from a desired position and producing a potential of a sense and magnitude dependent respectively on the direction and amount of said movement; electrical circuitry means connected to said sensing means modifying said potential comprising, rate responsive means producing a first output proportional in magnitude to the rate of change of said potential, nonlinear potential responsive means producing a second output substantially equal to said potential raised to the $1/n$ power, and means combining said first and second outputs to produce a resultant output proportional to the sum of said first and second outputs; driving means for said object energizable to rotate said object, said driving means when deenergized providing free movement of said object on its mountings to utilize the self-stability of a heavy object; and means connecting said electrical circuitry means in controlling relation to said driving means so that movement of said object producing control signals from said sensing means acts through said electrical circuitry means to energize said driving means thus driving said object back to the desired position.

8. In a rebalanceable control system; a controlled object; variable speed driving means connected to drive said object, said driving means comprising positive displacement hydraulic motor means, valve means including open center valve means, constant displacement hydraulic pump means, and means including said open center valve means connecting said constant displacement pump means in a driving relation to said motor means, said open center valve means being adjustable to control the energization of said motor means; displacement responsive means mounted on said controlled object, which means produces an electrical error potential output of a phase and magnitude determined by the direction and amount of displacement of said controlled object from a desired position; and electrical means connected to the output of said displacement responsive means comprising parallel circuit means, including first circuit means responsive to the rate of change of said error potential and producing a first output voltage proportional in magnitude to said rate of change, second nonlinear circuit means responsive to said error potential and producing a second output voltage of a magnitude which is substantially the square root of said error potential, and amplifier means responsive to the sum of said first and second voltages producing a control signal output which is proportional to said summed voltages, said amplifier means connected to control actuation of said valve means so that said motor means is operated thereby to drive said controlled object in a direction to remove said displacement error potential.

9. In a control system for stabilizing a controlled object having a predetermined frequency of vibration; displacement responsive means mounted on said controlled object, which displacement responsive means produces an electrical error potential output of a sense and magnitude determined by the direction and amount of displacement of said controlled object from a desired position, said displacement responsive means having a frequency response at least as high as said predetermined frequency; electrical circuit means having a frequency response at least as high as said predetermined frequency connected to the output of said displacement responsive means for modifying said error potential, said electrical circuit means comprising rate means providing a leading phase relation to said error potential in excess of 90 electrical degrees; variable speed driving means having a frequency response at least as high as said predetermined frequency connected to said controlled object and actuated in accordance with the modified output potential from said electrical circuit means to drive said controlled object back to said desired position; and frequency selective attenuating means effective above and in the frequency range of said predetermined frequency of vibration connected to said electrical circuit means for reducing to a minimum the electrical potentials above and in the range of said predetermined frequency which are applied to said variable speed driving means, whereby said control system is made substantially insensitive to said vibration, said attenuating means having a lagging phase relation effect on said error potential no greater than the leading phase relation provided by said rate means.

10. In a control system for a movable object having an undesirable predetermined frequency of vibration; motor means for moving said object, said motor means having a frequency response at least as high as said predetermined frequency; signal impulse producing means; electrical control means connected to control said motor means, said electrical control means being connected to said signal impulse producing means and capable of providing electrical signal impulses at a frequency at least as high as said predetermined frequency, said electrical control means including rate means providing a leading phase relation in excess of 90 electrical degrees to said signal impulses; and electrical signal attenuating means for reducing to a minimum the electrical control impulses above and in the range of said predetermined frequency of vibration which are applied to said motor means, whereby said control system is made substantially not responsive to said vibration, said electrical attenuating means having a lagging phase relation effect on said signal impulses no greater than the leading phase relation provided by said rate means.

11. In a control system for stabilizing a movable object having an undesirable predetermined frequency of vibration, motor means for moving said object, said motor means having a frequency response at least as high as said predetermined frequency, displacement responsive means for sensing displacement of said movable object from a desired position, said displacement responsive means providing an output error potential of a magnitude determined by the amount of displacement of said movable object, electrical control means, further means connecting the output of said displacement responsive means to said electrical control means, said electrical control means being connected in controlling relation to said motor means, whereby an error signal from said displacement responsive means is effective to energize said motor means to return said movable object to the desired position, said electrical control means including rate means providing a leading phase relation greater than 90 electrical degrees to said output error potential, and frequency selective signal attenuating means effective to attenuate signals above and in the frequency range of said undesirable predetermined frequency of vibration, said attenuating means being connected intermediate said electrical control means and said motor means for reducing to a minimum the electrical signal potentials above and in the range of said predetermined frequency which are applied to said motor means, whereby said control system is made relatively insensitive to said frequency of vibration, said attenuating means having a lagging phase relation effect on said error potential which effect is less than the leading phase relation provided by said rate means.

References Cited in the file of this patent

UNITED STATES PATENTS

| | | |
|---|---|---|
| 1,988,458 | Minorsky | Jan. 22, 1935 |
| 2,381,161 | Lynn | Aug. 7, 1945 |
| 2,408,068 | Hull et al. | Sept. 24, 1946 |
| 2,532,334 | Rhyne et al. | Dec. 5, 1950 |
| 2,592,417 | Hale | Apr. 8, 1952 |
| 2,679,138 | Kane | May 25, 1954 |
| 2,704,489 | Hammond et al. | Mar. 22, 1955 |